(12) United States Patent
Komura et al.

(10) Patent No.: US 12,032,247 B2
(45) Date of Patent: Jul. 9, 2024

(54) LIQUID CRYSTAL DISPLAY DEVICE HAVING PIXELS WITH DIFFERENT APERTURE AREAS

(71) Applicant: Japan Display Inc., Tokyo (JP)

(72) Inventors: Shinichi Komura, Tokyo (JP); Koichi Okuda, Tokyo (JP); Ken Onoda, Tokyo (JP); Hiroaki Kijima, Tokyo (JP)

(73) Assignee: Japan Display Inc., Tokyo (JP)

(*) Notice: Subject to any disclaimer, the term of this patent is extended or adjusted under 35 U.S.C. 154(b) by 274 days.

(21) Appl. No.: 17/664,076

(22) Filed: May 19, 2022

(65) Prior Publication Data

US 2022/0382111 A1 Dec. 1, 2022

(30) Foreign Application Priority Data

May 31, 2021 (JP) .................................. 2021-091329

(51) Int. Cl.
*G02F 1/1343* (2006.01)
*F21V 8/00* (2006.01)
*G02F 1/13357* (2006.01)

(52) U.S. Cl.
CPC ..... *G02F 1/134345* (2021.01); *G02B 6/0055* (2013.01); *G02B 6/0068* (2013.01); *G02F 1/133621* (2013.01); *G02F 2201/52* (2013.01)

(58) Field of Classification Search
CPC ....................... G02F 2201/40; G02F 1/134345
See application file for complete search history.

(56) References Cited

FOREIGN PATENT DOCUMENTS

| JP | 8-84347 A | 3/1996 | |
|---|---|---|---|
| JP | 2009-229791 | * 10/2009 | ......... G02F 1/13357 |
| JP | 2009-229791 A | 10/2009 | |

* cited by examiner

*Primary Examiner* — Lauren Nguyen
(74) *Attorney, Agent, or Firm* — Maier & Maier, PLLC

(57) ABSTRACT

According to one embodiment, a liquid crystal display device includes a display panel including a red sub-pixel, a green sub-pixel and a blue sub-pixel and an illumination device including a red light-emitting element, a green light-emitting element and a blue light emitting element and irradiating a mixture of light emitted by the light emitting elements onto the display panel. Further, of the red sub-pixel, the green sub-pixel and the blue sub-pixel, an aperture area of a sub-pixel having a lowest wall plug efficiency of the light emitting element of a respective color is greater than aperture areas of the sub-pixels of other colors.

9 Claims, 6 Drawing Sheets

|  | R | G | B |
|---|---|---|---|
| Light source wavelength | 630nm | 532nm | 467nm |
| Transmittance of pixel ($T_R$, $T_G$, $T_B$) | 0.90 | 0.75 | 0.65 |
| Light intensity ratio ($r_W$, 1, $b_W$) | 1.29 | 1 | 0.96 |

FIG. 5

| | WPE | | | Optimal aperture | | | Power W | Power $W_0$ for the case of equal apertures | $W/W_0$ |
|---|---|---|---|---|---|---|---|---|---|
| | $\eta_R$ | $\eta_G$ | $\eta_B$ | $A_R$ | $A_G$ | $A_B$ | | | |
| Condition 1 | 0.4 | 0.1 | 0.2 | 0.23 | 0.44 | 0.33 | 39.3 | 41.9 | 0.94 |
| Condition 2 | 0.4 | 0.1 | 0.4 | 0.25 | 0.49 | 0.26 | 32.1 | 35.6 | 0.90 |
| Condition 3 | 0.4 | 0.2 | 0.2 | 0.26 | 0.36 | 0.38 | 29.8 | 30.4 | 0.98 |
| Condition 4 | 0.4 | 0.4 | 0.4 | 0.33 | 0.33 | 0.33 | 18.3 | 18.3 | 1.00 |

FIG. 6 ent and irradiating a mixture of light emitted by the light emitting elements onto the display panel. Further, of the red sub-pixel, the green sub-pixel and the blue sub-pixel, an aperture area of a sub-pixel having a lowest wall plug efficiency of the light emitting element of a respective color is greater than aperture areas of the sub-pixels of other colors.

LIQUID CRYSTAL DISPLAY DEVICE HAVING PIXELS WITH DIFFERENT APERTURE AREAS

CROSS-REFERENCE TO RELATED APPLICATIONS

This application is based upon and claims the benefit of priority from Japanese Patent Application No. 2021-091329, filed May 31, 2021, the entire contents of which are incorporated herein by reference.

FIELD

Embodiments described herein relate generally to a liquid crystal display device.

BACKGROUND

Liquid crystal display devices include a display panel which contains a liquid crystal layer and an illumination device which irradiates light onto the display panel. The display panel includes a large number of pixels arrayed therein. In general, the pixels each contain red, green and blue sub-pixels.

The illumination device is, for example, an edge-lit backlight, and includes a light guide opposing the display panel and a plurality of light-emitting elements that irradiate light to a side surface of the light guide.

BRIEF DESCRIPTION OF THE DRAWINGS

FIG. 5 is a table showing light source wavelength, transmittance and light intensity ratio in an example.

FIG. 6 is a table showing wall plug efficiency and aperture area and the like in the example.

DETAILED DESCRIPTION

Figure 1:
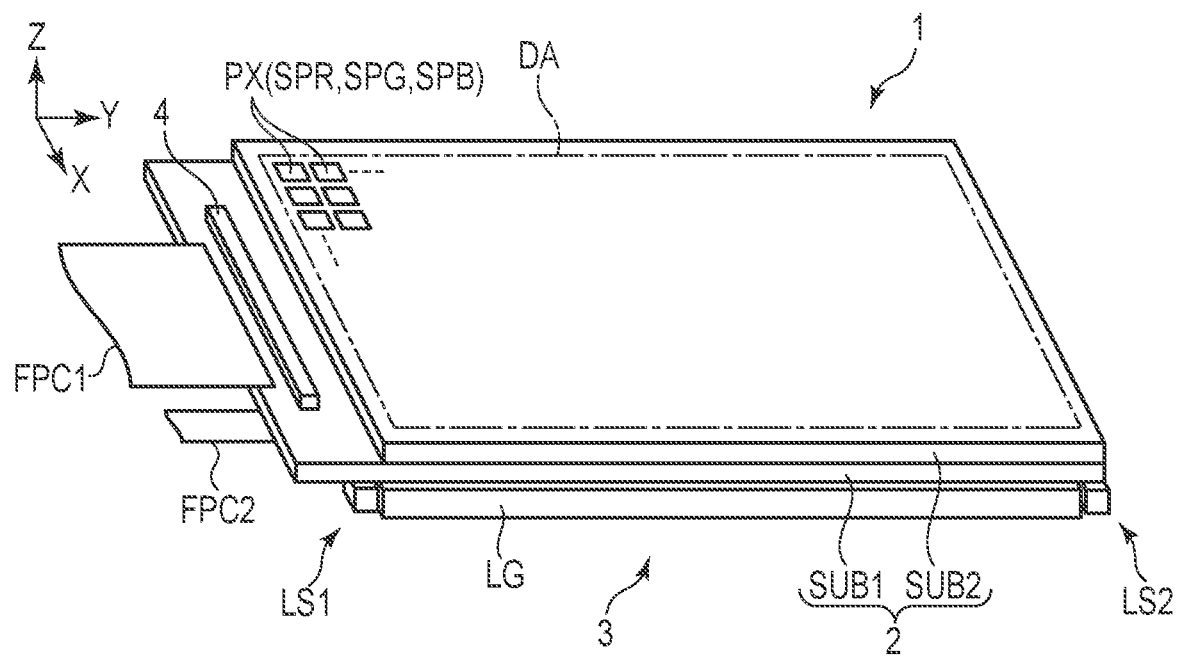
FIG. 1 is a perspective diagram schematically showing a configuration of a liquid crystal display device according to an embodiment.

In general, according to one embodiment, a liquid crystal display device comprises a display panel including a red sub-pixel, a green sub-pixel and a blue sub-pixel and an illumination device including a red light-emitting element, a green light-emitting element and a blue light emitting element and irradiating a mixture of light emitted by the light According to such configurations, it is possible to provide a liquid crystal display device which can saver power.

Embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

In each embodiment, a transmissive liquid crystal display device is disclosed as an example of a display device. Further, a backlight of a liquid crystal display device is disclosed as an example of an illumination device. However, each embodiment does not preclude the application of individual technical ideas disclosed in each embodiment to other types of display devices and illumination devices.

Embodiment 1

FIG. 1 is a perspective diagram schematically showing a configuration of a liquid crystal display device 1 (to be referred to simply as "display device 1" hereinafter). Note that the display device 1 can be used in various devices, for example, smartphones, tablet terminals, cell phone terminals, personal computers, TV receivers, in-vehicle devices, game consoles, wearable terminals and the like.

The display device 1 comprises a display panel 2, an Illumination device 3, which is a backlight, a drive IC chip (controller) which drives the display panel 24, a first flexible circuit board FPC1 which supplies control signals to the display panel 2, and a second flexible circuit board FPC2 which supplies control signals to the illumination device 3. For example, the flexible circuit boards FPC1 and FPC2 each are connected to a control module which controls the operation of the display panel 2 and the illumination device 3.

The display panel 2 comprises a first substrate SUB1 (an array substrate) and a second substrate SUB2 (a counter substrate) opposing the first substrate SUB1. The display panel 2 includes a display area DA which displays images. The display panel 2 comprises a plurality of pixels PX arranged, for example, in a matrix in the display area DA. The pixels PX each contains a red sub-pixel SPR, a green sub-pixel SPG and a blue sub-pixel SPB. The pixels PX each may further include a white sub-pixel and the like.

The illumination device 3 includes a first light source LS1, a second light source LS2 and a light guide LG opposing the first substrate SUB1. The first light source LS1 opposes one side surface of the light guide LG, and the second light source LS2 opposes the other side surface of the light guide LG.

As shown in FIG. 1, a first direction X, a second direction Y and a third direction Z are defined. The directions X, Y, and Z are, for example, orthogonal to each other. In this disclosure, viewing the display device 1 from a direction parallel to the third direction Z is called a planar view. In the example of FIG. 1, each of the substrates SUB1 and SUB2 and the light guide LG includes short sides along the first direction X and long sides along the second direction Y, and, in planar view, is rectangular in shape. But, the shape of the substrates SUB1 and SUB2 and the light guide LG is not limited to this, but may be other shapes such as square or circular in planar view.

Figure 2:
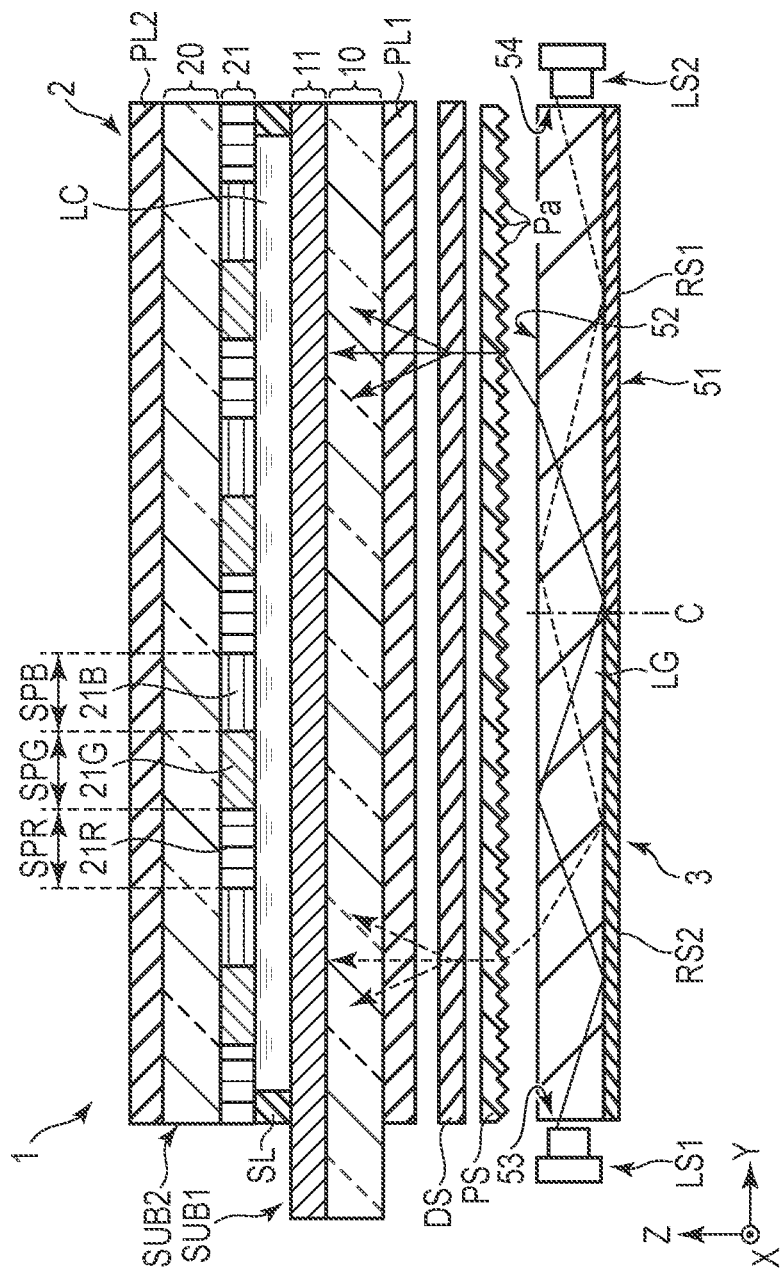
FIG. 2 is a cross-sectional view schematically showing the liquid crystal display device according to the embodiment.

FIG. 2 is a cross-sectional view schematically showing the display device 1, parallel to a Y-Z plane. The display panel 2 further comprises a sealant SL, a liquid crystal layer LC, a first polarizer PL 1 and a second polarizer PL2. The first substrate SUB1 and the second substrate SUB 2 are attached together by the sealant SL. The liquid crystal layer LC is sealed in a space enclosed by the sealant SL, the first substrate SUB1 and the second substrate SUB2.

The first polarizer PL1 is attached on a lower surface (the surface opposing the light guide LG) of the first substrate SUB1. The second polarizer PL2 is attached to an upper surface (the surface not opposing the first substrate SUB1) of the second substrate SUB2. The polarisation axes of the polarizers PL1 and PL2 are, for example, orthogonal to each other.

The first substrate SUB1 comprises a first base 10 and a circuit layer 11. As the first base 10, a transparent glass substrate or resin substrate can be used. The circuit layer 11 includes, for example, wiring lines, thin-film transistors, pixel electrodes, common electrodes and various insulating layers.

The second substrate SUB2 comprises a second base 20 and a color filter layer 21. As the second base 20, a transparent glass substrate or resin substrate can be used, as in the case of the first base 10. The color filter layer 21 comprises a red color filter 21R disposed in the sub-pixel SPR, a green color filter 21G disposed in the sub-pixel SPG and a blue color filter 21B disposed in the sub-pixel SPB.

The light guide LG includes a first surface 51, a second surface 52 on an opposite side to the first surface 51, a first side surface 53 and a second side surface 54 on an opposite side to the first side surface 53. The display panel 2 opposes the second surface 52.

The first light source LS1 opposes the first side surface 53 and the second light source LS2 opposes the second side surface 54. The first, light source LS1 irradiates light on the first side surface 53. The second light source LS2 irradiates light on the second side surface 54. Between the first light source LS1 and the first side surface 53 and between the second light source LS2 and the second side surface 54, an optical element such as lens may be provided to adjust the width and angle of light from each of the light sources LS1 and LS2.

On the first surface 51 of the light guide LG, a first reflective structure RS1 and a second reflective structure RS2 are provided. The first reflective structure RS1 is located between a center C of the light guide LG along the second direction Y and the second side surface 54. The second reflective structure RS2 is located between the center C and the first side surface 53. The reflective structures RS1 and RS2 are, for example, prisms elongated along the first direction X. The first reflective structure RS1 reflects light, from the first light source LS1, and emits the light from the second surface 52. The second reflective structure RS2 reflects light from the second light source LS2 and emits the light from the second surface 52.

The display device 1 comprises a prism sheet PS between the display panel 2 and the light guide LG. Further, the display device 1 comprises a diffusion sheet DS (a diffusion layer) between the prism sheet PS and the display panel 2. For example, the prism sheet PS includes a number of prisms Pa extending parallel to the first direction X.

The prism sheet PS converts light emitted from the second surface 52 into light substantially parallel to the third direction Z. Here, the expression "light substantially parallel to the third direction Z" means not only light strictly parallel to the third direction Z, but also light converted by the prism sheet PS such that the inclination thereof with respect to the third direction Z is sufficiently smaller than that when emitted from the second surface 52. The light that has passed through the prism sheet PS is diffused by the diffusion sheet DS and irradiated onto the display panel 2.

Note that when the light from each of the light sources LS1 and LS2 reaches the display panel 2 in a sufficiently polarized state, the first polarizer PL1 may be omitted.

Figure 3:
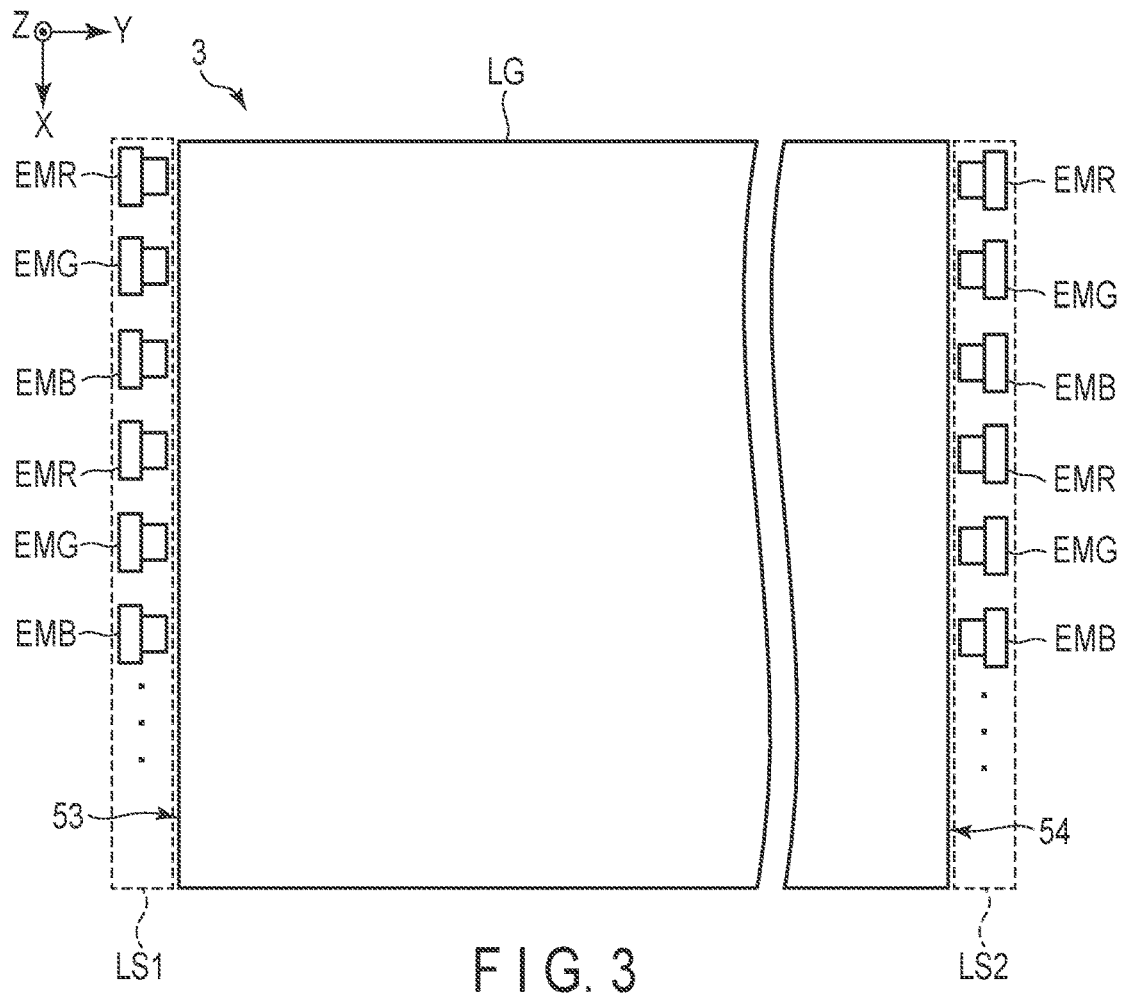
FIG. 3 is a plan view schematically showing an illumination device according to the embodiment.

FIG. 3 is a plan view schematically showing the illumination device 3. The first light source LS1 includes a light-emitting element EMR emitting red light, a light-emitting element EMG emitting green light and a light-emitting element EMB that emits blue light. Similarly, the second light source LS2 includes light-emitting elements EMR, EMG and EMB.

In the first light, source LS1, the light-emitting elements EMR, EMG and EMB are repeatedly arranged in this order along the first direction X. In the second light source LS2 as well, the light-emitting elements EMR, EMG and EMB are repeatedly arranged in this order along the first direction X. The light-emitting elements EMR, EMR and EMB of the first light source LS1 irradiate light onto the first side surface 53. The light-emitting elements EMR, EMG and EMB of the second light source LS2 irradiate light onto the second side surface 54.

As the light-emitting elements EMR, EMG and EMB, for example, a semiconductor laser (laser diode) which emits polarized laser light can be used. On the display panel 2, mixture of light (for example, white light) emitted by the light-emitting elements EMR, EMG and EMB is irradiated.

Figure 4:
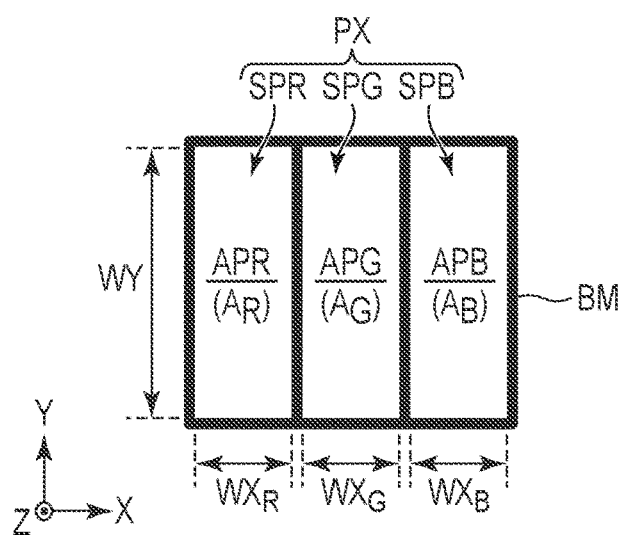
FIG. 4 is a plan view schematically showing sub-pixels according to the embodiment.
Figure 7:
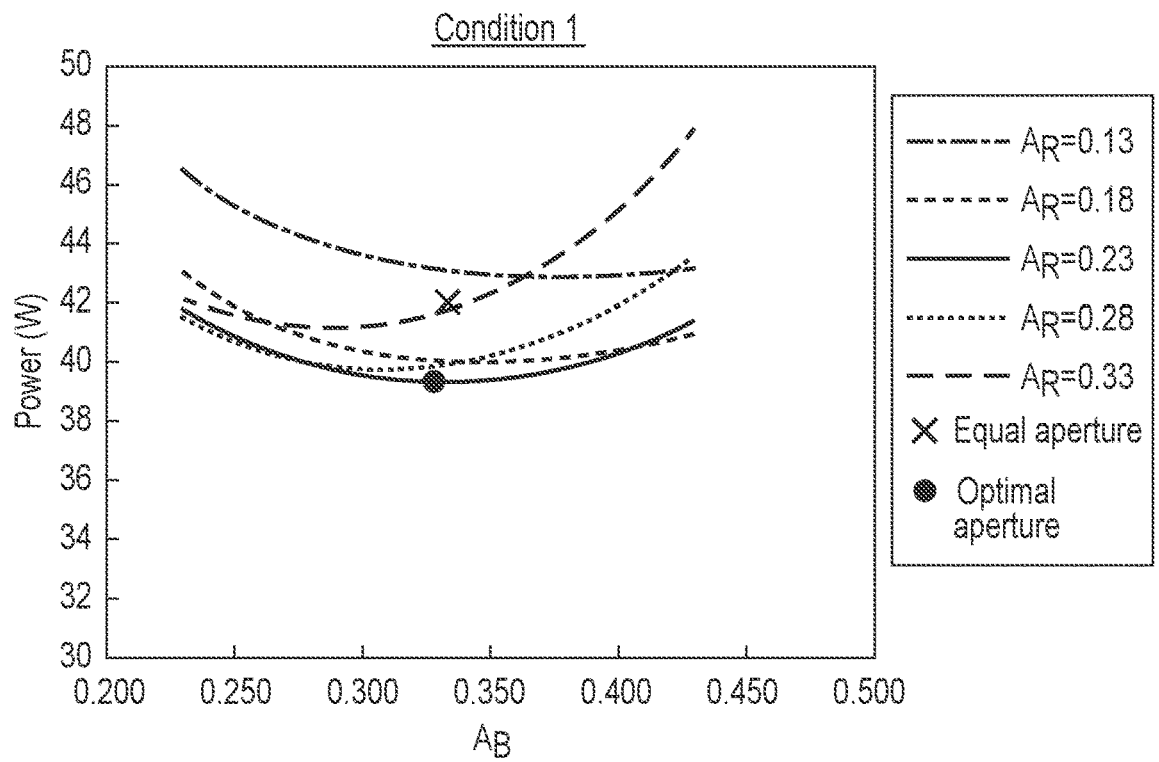
FIG. 7 is a graph showing the relationship between aperture area and total power consumption under condition 1 in FIG. 6.

FIG. 4 is a plan view schematically showing the sub-pixels SPR, SPG and SPB contained in each pixel PX. In the example shown in FIG. 4, the sub-pixels SPR, SPG and SPB are aligned along the first direction X. On the boundary between each adjacent pair of the sub-pixels SPR, SPG and SPB, a light-shielding layer BM is disposed. The light-shielding layer BM is formed on the second substrate SUB2, for example.

The sub-pixel SPR includes an aperture region APR surrounded by the light-shielding layer BM. The sub-pixel SPG includes an aperture region APG surrounded by the light-shielding layer BM. The sub-pixel SPB includes an aperture region APB surrounded by the light-shielding layer BM.

The aperture regions APR, APG and APB each are a region which can transmit light from the illumination device 3. The aperture region APR overlaps the color filter 21R, the aperture region APG overlaps the color filter 21G, and the aperture region APB overlaps the color filter 21B.

In the example in FIG. 4, the aperture regions APR, APG and APB all have a width WY taken along the second direction Y. In the first direction X, the aperture region APR has a width $WX_R$, the aperture region APG has a width $WX_G$, and the aperture region APB has a width $WX_B$.

The shapes of the aperture regions APR, APG and APB are not limited to those of the example in FIG. 4. For example, the aperture regions APR, APG and APB may have widths different from each other along the second direction Y. Further, the aperture regions APR, APG and APB may not necessarily be aligned along the first direction X.

In this embodiment, the aperture regions APR, APG, APB are at least partially different from each other in aperture area. Specifically, when the aperture regions APR, APG and APB have the same width along the second direction Y as described above, the widths $WX_R$, $WX_G$ and $WX_B$ are at least partially different from each other.

Here, how to determine the area of each of the aperture regions APR, APG and APB will be described. In this embodiment, in order to reduce the power consumption of the display device 1, the area of each of the aperture regions APR, APG and APR is determined in consideration of the wall plug efficiently (WPE) of each of the light-emitting elements EMR, EMG and EMB and the transmittance of each of the sub-pixels SPR, SPG and SPB, and the like. The wall plug efficiency represents the ratio of the light output of a light-emitting element to the power input to the light-emitting element.

Hereafter, the wall plug efficiency of the light emitting element EMR is defined as $\eta_R$, the wall plug efficiency of the light emitting element EMG is defined as $\eta_G$, the wall plug efficiency of the light emitting element EMB is defined as $\eta_B$, the transmittance of the sub-pixel SPR is defined as $T_R$, the transmittance of the sub-pixel SPG is defined as $T_G$, the transmittance of the sub-pixel SPB is defined as $T_B$, the light intensity of the sub-pixel SPR is defined as $T_R$, the light intensity of the sub-pixel SPG is defined as $T_G$, and the light intensity of the sub-pixel SPB is defined as $I_B$. Further, the aperture area of the sub-pixel SPR (the area of the aperture region APR) is defined as $A_R$, the aperture area of the sub-pixel SPG (the area of the aperture region APG) is defined as $A_G$, and the aperture area of the sub-pixel SPB (the area of the aperture region APB) is defined as $A_B$. Note it is here assumed that the aperture areas $A_R$, $A_G$ and $A_B$ are relative values, and $A_R + A_G + A_B$ is 1.

The ratio between the light intensities $I_R$, $I_G$ and $I_B$, which satisfies the conditions of displaying white color (white balance conditions) by mixing the colors displayed by the sub-pixel SPB and the sub-pixels SPR, SPG and SPB will be expressed by the following equation.

$$I_R : I_G : I_B = r_W : 1 : b_W \quad \text{[Equation 1]}$$

The ratio of the wall plug efficiencies $\eta_R$, $\eta_G$ and $\eta_B$ will be expressed by the following equation.

$$\eta_R : \eta_G : \eta_B = r_\eta : 1 : b_\eta \quad \text{[Equation 2]}$$

The ratio of the transmittances $T_R$, $T_G$ and $T_B$ will be expressed by the following equation.

$$T_R : T_G : T_B = r_T : 1 : b_T \quad \text{[Equation 3]}$$

In this embodiment, the ratio of the aperture areas $A_R$, $A_G$ and $A_B$ is determined to satisfy the following equation (1).

[Equation 4]

$$A_R : A_G : A_B = \sqrt{\frac{r_W}{r_T r_\eta}} \pm \alpha : 1 : \sqrt{\frac{b_W}{b_T b_\eta}} \pm \beta \quad (1)$$

Here, $\alpha$ and $\beta$ satisfy the following equations (2) and (3), and should preferably be zero.

[Equation 5]

$$\alpha \leq \frac{1}{2} \left| 1 - \sqrt{\frac{r_W}{r_T r_\eta}} \right| \quad (2)$$

[Equation 6]

$$\beta \leq \frac{1}{2} \left| 1 - \sqrt{\frac{b_W}{b_T b_\eta}} \right| \quad (3)$$

Next, the grounds for the equation (1) will now be explained. In the following descriptions, the power input to the light-emitting element EMR is defined as $W_R$, the power input to the light-emitting element EMG is defined as $W_G$, and the power input to the light-emitting element EMB is defined as $W_B$.

The light intensities $I_R$, $I_G$ and $I_B$ are expressed by the following equation.

$$I_R = T_R \eta_R W_R A_R, \; I_G = T_G \eta_G W_G A_G, \; I_B = T_B \eta_B W_B A_B \quad \text{[Equation 7]}$$

The total power consumption W of the light-emitting elements EMR, EMG and EMB will be expressed by the following equation.

$$\begin{aligned}
W &= W_R + W_G + W_B = \frac{I_R}{T_R \eta_R A_R} + \frac{I_G}{T_G \eta_G A_G} + \frac{I_B}{T_B \eta_B A_B} \quad \text{[Equation 8]} \\
&= \frac{I_G}{T_G \eta_G} \left( \frac{I_R}{I_G} \frac{T_G}{T_R} \frac{\eta_G}{\eta_R} \frac{1}{A_R} + \frac{1}{A_G} + \frac{I_B}{I_G} \frac{T_G}{T_B} \frac{\eta_G}{\eta_B} \frac{1}{A_B} \right) \\
&= \frac{I_G}{T_G \eta_G} \left( \frac{r_W}{r_T r_\eta} \frac{1}{A_R} + \frac{1}{A_G} + \frac{b_W}{b_T b_\eta} \frac{1}{A_B} \right) \\
&= \frac{I_G}{T_G \eta_G} \left( \frac{r}{A_R} + \frac{1}{A_G} + \frac{b}{A_B} \right)
\end{aligned}$$

Note that $r_W$, $b_W$, $r_T$, $b_T$, $r_\eta$, $b_\eta$, r and b will be expressed as follows. The items $r_W$ and $b_W$ are uniquely determined by the white balance conditions.

$$r_W = \frac{I_R}{I_G}, \; b_W = \frac{I_B}{I_G}, \; r_T = \frac{T_R}{T_G}, \; b_T = \frac{T_B}{T_G}, \quad \text{[Equation 9]}$$

$$r_\eta = \frac{\eta_R}{\eta_G}, \; b_\eta = \frac{\eta_B}{\eta_G}, \; r = \frac{r_W}{r_T r_\eta}, \; b = \frac{b_W}{b_T b_\eta}$$

The luminance of each pixel PX is expressed by the following equation.

$$Y = S(y_R I_R + y_G I_G + y_B I_B) = \quad \text{[Equation 10]}$$
$$Sy_G I_G \left( \frac{y_R}{y_G} \frac{I_R}{I_G} + 1 + \frac{y_B}{y_G} \frac{I_B}{I_G} \right) = Sy_G I_G \left( \frac{y_R}{y_G} r_w + 1 + \frac{y_B}{y_G} b_w \right)$$

Here, $y_R$, $y_G$, and $y_B$ are isochromatic functions at red, green, and blue wavelengths, respectively, and S is a proportionality constant that associates the light intensity of each of the sub-pixels SPR, SPG and SPB with the luminance corresponding to the luminous flux per unit area.

From the above, the efficiency (Y/W) with respect to the luminance Y and the power W can be expressed by the following equation.

$$\frac{Y}{W} = \frac{Sy_G I_G \left(\frac{y_R}{y_G} r_W + 1 + \frac{y_B}{y_G} b_W\right)}{\frac{I_G}{T_G \eta_G}\left(\frac{r}{A_R} + \frac{1}{A_G} + \frac{b}{A_B}\right)} = \quad \text{[Equation 11]}$$

$$Sy_G T_G \eta_G \frac{\left(\frac{y_R}{y_G} r_W + 1 + \frac{y_B}{y_G} b_W\right)}{\left(\frac{r}{A_R} + \frac{1}{A_G} + \frac{b}{A_B}\right)}$$

In the case where the white balance conditions ($r_W$, $b_W$), the transmittances ($T_R$, $T_G$ and $T_B$) of the respective sub-pixels SPR, SPG and SPA, the wavelengths ($y_R$, $y_G$, $y_B$) of the respective sub-pixels SPR, SPG and SPB and the wall plug efficiencies ($\eta_R$, $\eta_G$, $\eta_B$) of the respective light-emitting elements EMR, EMG and EMB are fixed, the efficiency (Y/W) with respect to the luminance Y and the power W will be functions of the aperture areas $A_R$, $A_G$ and $A_B$.

In other words, the aperture areas $A_R$, $A_G$ and $A_B$, which minimize the following equation are the condition for maximizing the efficiency (Y/W).

$$W' = \left(\frac{r}{A_R} + \frac{1}{A_G} + \frac{b}{A_B}\right) \quad \text{[Equation 12]}$$

The above-provided equation can be rewritten as follows.

$$W' = \left(\frac{r}{A_R} + \frac{1}{1 - A_R - A_B} + \frac{b}{A_B}\right) \quad \text{[Equation 13]}$$

Here, the condition for the partial derivative to be zero is as follows.

$$\frac{\partial W'}{\partial A_R} = -\frac{r}{A_R^2} + \frac{1}{(1 - A_R - A_B)^2} = 0 \quad \text{[Equation 14]}$$

$$\frac{\partial W'}{\partial A_B} = -\frac{b}{A_B^2} + \frac{1}{(1 - A_R - A_B)^2} = 0$$

Based on this, the folloing equation is obtained.

$$(1+\sqrt{r})A_R + \sqrt{r}A_B = \sqrt{r}$$

$$\sqrt{b}A_R + (1+\sqrt{b})A_B = \sqrt{b} \quad \text{[Equation 15]}$$

By solving the simultaneous equations, the aperture areas $A_R$ and $A_B$ can be obtained as follows.

$$A_R = \frac{\sqrt{r}}{(1+\sqrt{r})(1+\sqrt{b}) - \sqrt{r}\sqrt{b}} \quad \text{[Equation 16]}$$

$$A_B = \frac{\sqrt{b}}{(1+\sqrt{r})(1+\sqrt{b}) - \sqrt{r}\sqrt{b}}$$

The aperture area $A_G$ is expressed by the following equation.

$$A_G = \quad \text{[Equation 17]}$$

$$1 - A_R - A_B = \frac{(1+\sqrt{r})(1+\sqrt{b}) - \sqrt{r}\sqrt{b} - \sqrt{r} - \sqrt{b}}{(1+\sqrt{r})(1+\sqrt{b}) - \sqrt{r}\sqrt{b}} =$$

$$\frac{1}{(1+\sqrt{r})(1+\sqrt{b}) - \sqrt{r}\sqrt{b}}$$

From the above, the relationship between the aperture areas $A_R$, $A_G$ and $A_B$, which minimizes the power consumption can be obtained as expressed by the following equation (1a).

[Equation 18]

$$A_R : A_G : A_B = \sqrt{r} : 1 : \sqrt{b} = \sqrt{\frac{r_W}{r_T r_\eta}} : 1 : \sqrt{\frac{b_W}{b_T b_\eta}} \quad (1a)$$

In this embodiment, terms α and β are defined as in equations (1), (2) and (3) provided above. The term α indicated in equation (2) is equivalent to a value of ½ or less of the absolute value of the difference between $A_R$ of the case where the aperture areas of the sub-pixels SPR, SPB and SPG are equal to each other and $A_R$ shown by the equation (1a). The term β indicated in equation (3) is equivalent to a value of ½ or less of the absolute value of the difference between $A_B$ of the case where the aperture areas of the sub-pixels SPR, SPB and SPG are equal to each other and $A_B$ shown by the equation (1a). When $A_R$ and $A_B$ are determined within the range defined by using the terms α and β, a sufficient advantageous effect of reducing the power consumption can be obtained as compared to the case where the aperture areas the sub-pixels SPR, SPR and SPB are equal to each other.

[Examples]

FIG. 5 is a table showing the light source wavelength, transmittance and light intensity ratio of an example. As shown in this table, a this example, the light source wavelength of red color (R) (the wavelength of laser beam emitted by the light-emitting element EMR) is mainly 63 nm, the light source wavelength of green color (G) (the wavelength of laser beam emitted by the light-emitting element EMG) is mainly 532 nm, and the light source wavelength of blue color (B) (the wavelength of laser beam emitted by the light-emitting element EMB) is mainly 467 nm. Further, the transmittance $T_R$ of the red (R) sub-pixel SPR at a wavelength of 630 nm is 0.90, the transmittance $T_G$ of the green (G) sub-pixel SPG at a wavelength of 532 nm is 0.75 and the transmittance of the blue (B) sub-pixel SPB at a wavelength of 467 nm is 0.65. The light intensity ratio ($r_W$:1:$b_W$) that satisfies the white balance conditions is 1.29:1:0.96.

FIG. 6 is a table showing the wall plug efficiencies $\eta_R$, $\eta_G$ and $\eta_B$ the aperture areas $A_R$, $A_G$ and $A_B$, and the like according to an example. In the example, four conditions were set for the wall plug efficiencies $\eta_R$, $\eta_G$ and $\eta_B$ of the light-emitting elements EMR, EMG and EMB, and for each condition, the aperture areas $A_R$, $A_G$ and $A_B$ were calculated based on the above-provided equation (1a). For each condition, the total power consumption W of the light-emitting elements EMR, EMG and EMB, the total power consumption $W_0$ of the light-emitting elements EMR, EMG and EMB of the case where the aperture areas $A_R$, $A_G$ and $A_B$ are equal to each other ($A_R:A_G:A_B=1:1:1$) and the ratio of the power values W and $W_0$ ($W/W_0$) were also calculated.

Under Condition 4, the wall plug efficiencies $\eta_R$, $\eta_G$ and $\eta_B$ are equal to each other, being 0.4. In this case, the aperture areas $A_R$, $A_G$ and $A_B$ thus calculated are all about 0.33, and no improvement in power consumption was observed.

On the other hand, under Conditions 1 to 3, the wall plug efficiencies $\eta_R$, $\eta_G$ and $\eta_B$ are not identical to each other. In each of these cases, the aperture areas $A_R$, $A_G$ and $A_B$ are non-uniform, and an improvement in power consumption was observed as compared to the case where the aperture areas of the sub-pixels SPR, SPG and SPB are equal to each other.

Especially, in Conditions 1 and 2, the wall plug efficiency $\eta_G$ is ¼ of the wall plug efficiency $\eta_R$, and thus the difference between these two cases is large. In such cases, it can be seen that the power consumption is greatly improved.

Further, in Conditions 1 and 2, the wall plug efficiency $\eta_G$ is smaller than the wall plug efficiencies $\eta_R$ and $\eta_B$, and the aperture area $A_G$ is larger than the aperture areas $A_R$ and $A_B$. Thus, it can be understood that, of the sub-pixels SPR, SPG and SPB, by increasing the aperture area of the sub-pixel with the lowest wall plug efficiency of the light emitting element of the corresponding color to be greater than those of the sub-pixels of the other colors, the power consumption can be reduced as compared to the case where the aperture areas of the sub-pixels SPR, SPG and SPB are equal to each other.

FIGS. 7, 8, 9 and 10 are graphs showing, under Conditions 1 to 4, respectively, the relationship between the aperture areas $A_R$, $A_B$ and the total power consumption of light-emitting elements EMR, EMG and EMB. In each graph, for each different value of the aperture area $A_R$, the relationship between the aperture area $A_B$ and the power consumption is shown using different types of lines. Note that the aperture area $A_G$ is $1-A_R-A_B$.

As can be seen from the graphs, the relationship between the aperture area $A_B$ and the power consumption is represented by a downward convex curve. This is also the case for the relationship between the aperture areas $A_R$ and $A_G$ and the power consumption. In each of the curves shown in the graphs, the point located at the lowest level (an "optimal aperture" in each graph) is equivalent to the aperture areas $A_R$, $A_G$ and $A_B$, where the power consumption at the lowest. In the graph of each diagram, the position of the case where the aperture areas $A_R$, $A_G$ and $A_B$ are equal to each other (an "equal aperture" in each graph) is indicated as well. Using the above-provided equation (1a), the optimal aperture shown in each graph can be obtained.

Figure 8:
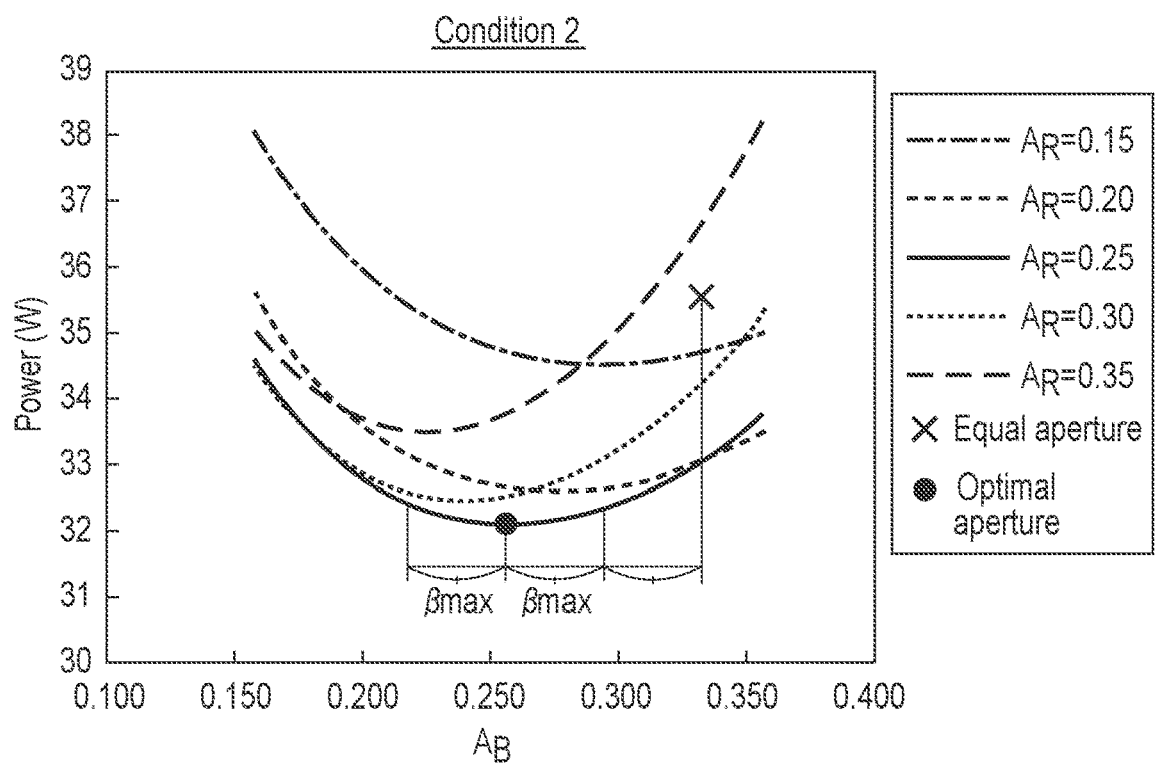
FIG. 8 is a graph showing the relationship between aperture area and total power consumption under condition 2 in FIG. 6.
Figure 9:
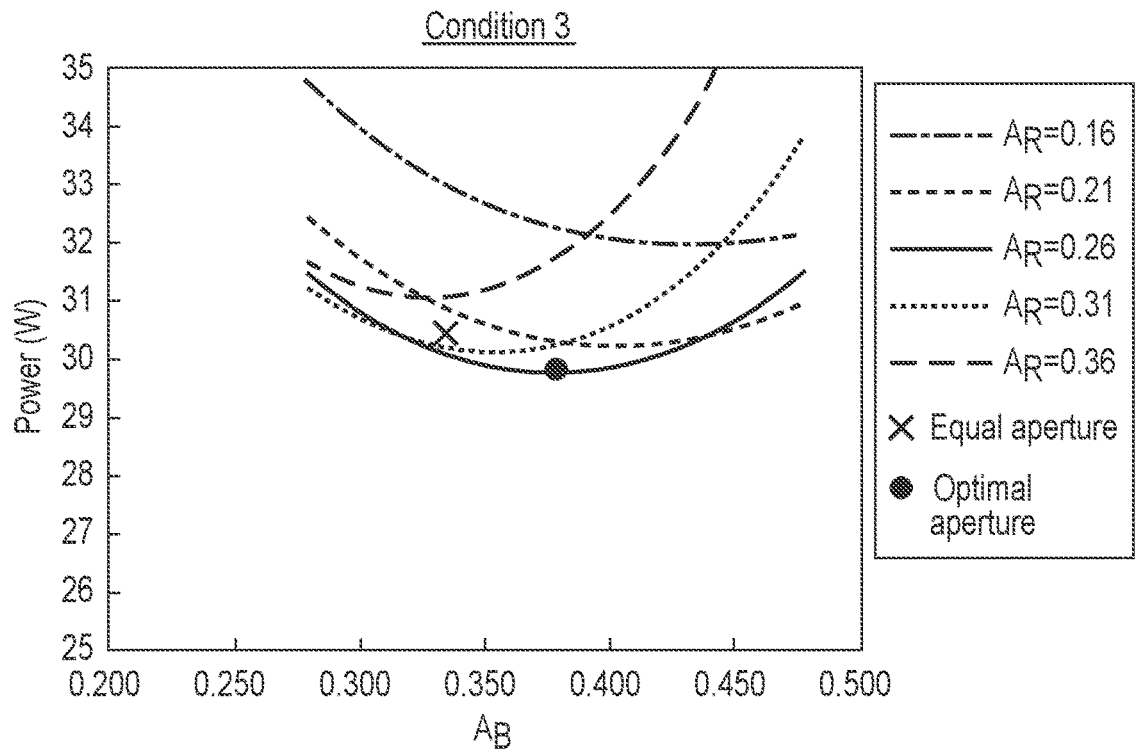
FIG. 9 is a graph showing the relationship between aperture area and total power consumption under condition 3 in FIG. 6.
Figure 10:
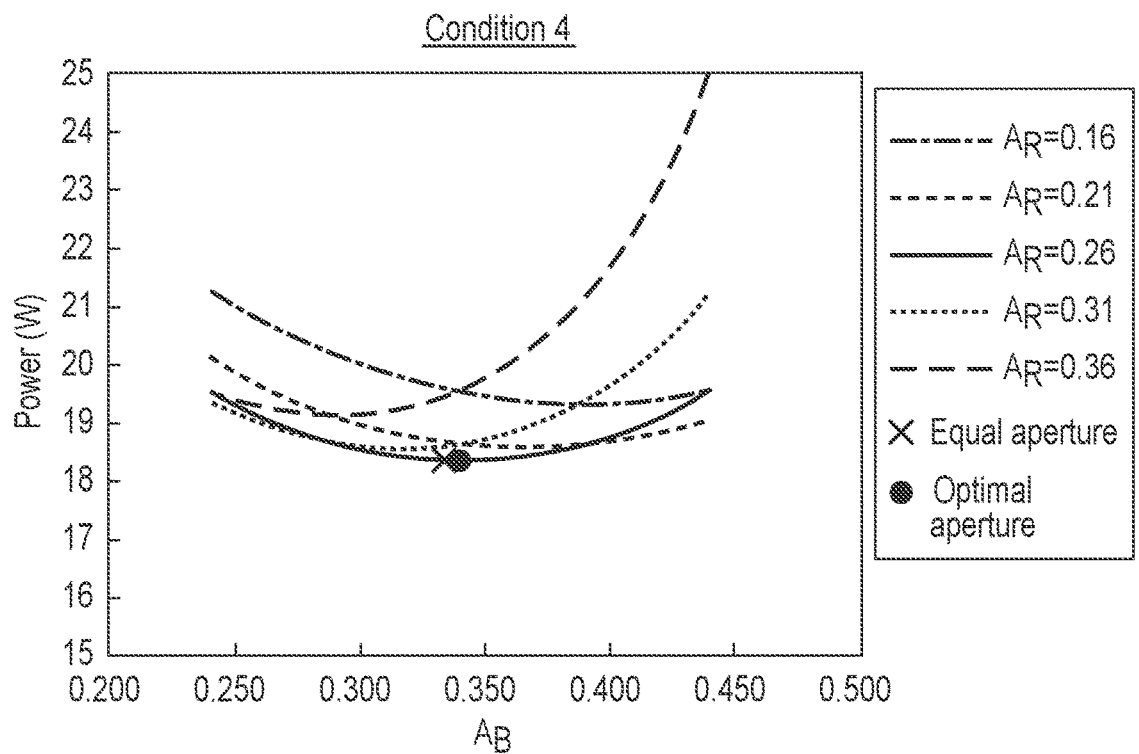
FIG. 10 is a graph showing the relationship between aperture area and total power consumption under condition 4 in FIG. 6.

Here, the term β shown in the above-provided equation (1) will be described with reference to FIG. 8. When focusing on a line segment of the case of $A_R=0.25$, it can be seen that even in the vicinity of the aperture area $A_B$, where the power consumption is at the minimum, the power consumption is sufficiently reduced as compared to the case of the equal aperture. Therefore, the range that can be adopted as the aperture area $A_B$ was defined using the term β as in the above-provided equation (1). Further, as shown in the above-provided equation (3), the upper limit of β (βmax shown in FIG. 8) is defined to be ½ of the absolute value of the difference between as the aperture area $A_B$ of the "equal aperture" and the aperture area $A_B$ of the "optimal aperture". As to the term α in the above-provided equation (1), a similar idea is applied to as shown by the above-provided equation (2).

According to the above-described embodiment, the aperture areas of the sub-pixels SPR, SPG and SPB are adjusted according to the wall plug efficiencies and other factors of the light-emitting elements EMR, EMG and EMB, and thus it is possible to provide a display device 1 with reduced power consumption.

Note that the transmittances $T_R$, $T_G$ and $T_B$ in this embodiment can be obtained by the following manner. That is, when a light source of a specific spectrum is disposed below the display panel 2 and the spectrum of light transmitted above the display panel 2 is measured while the sub-pixels SPR, SPG and SPB are respectively turned on at the maximum gradation. That is, for example, the transmittance $T_R$ is equivalent to the ratio of the intensity of the wavelength at the spectrum of the transmitted light of the sub-pixel SPR turned on with respect to the intensity of a red wavelength (for example, 630 nm) at the spectrum of the light source.

Further, the wall plug efficiencies $\eta_R$, $\eta_G$ and $\eta_B$ in this embodiment can be obtained by measuring the light emitted by the light-emitting elements EMR, EMG and EMB with a power meter. That is, for example, the wall plug efficiency $\eta_R$ is equivalent to the ratio of output obtained by measuring the light emitted by the light-emitting element EMR with the power meter, to the power calculated based on the input current and voltage when the light-emitting element EMR is on to emit light.

Based on the display device described above as embodiments of the present invention, a person having ordinary skill in the art may achieve a display device with an arbitral design change; however, as long as they fall within the scope and spirit of the present invention, all of such display devices are encompassed by the scope of the present invention.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step or a condition to/from/in the above-described embodiment, as long as they fall within the scope and spirit of the present invention, such addition, deletion, and altercation are encompassed by the scope of the present invention.

Furthermore, regarding the present embodiments, any advantage and effect those will be obvious from the description of the specification or arbitrarily conceived by a skilled person are naturally considered achievable by the present invention.

What is claimed is:

1. A liquid crystal display device comprising:
   a display panel including a red sub-pixel, a green sub-pixel and a blue sub-pixel; and
   an illumination device including a red light-emitting element, a green light-emitting element and a blue light emitting element and irradiating a mixture of light emitted by the light emitting elements onto the display panel, wherein
   of the red sub-pixel, the green sub-pixel and the blue sub-pixel, an aperture area of a sub-pixel having a lowest wall plug efficiency of the light emitting element of a respective color is greater than aperture areas of the sub-pixels of other colors wherein a ratio of a light intensity IR of the red sub-pixel, a light intensity Ig of the green sub-pixel, and a light intensity IB of the blue sub-pixel for displaying white color by the mixture of light is expressed by an equation below:

$$I_R:I_G:I_B = r_W:1:b_W \quad \text{[Equation 1]}$$

a ratio of a wall plug efficiency $\eta_R$ of the red light-emitting element, a wall plug efficiency $\eta_G$ of the green light-emitting element, and a wall plug efficiency $\eta_B$ of the blue light-emitting element is expressed by an equation below:

$$\eta_R:\eta_G:\eta_B = r_\eta:1:b_\eta \quad \text{[Equation 2]}$$

and a ratio of a transmittance $T_R$ of the red sub-pixel, a transmittance $T_G$ of the green sub-pixel, and a transmittance $T_B$ of the blue sub-pixel is expressed by an equation below:

$$T_R:T_G:T_B = r_T:1:b_T \quad \text{[Equation 3]}$$

an aperture area $A_R$ of the red sub-pixel, an aperture area $A_G$ of the green sub-pixel, and an aperture area $A_B$ of the blue sub-pixel satisfy an equation below:

$$A_R:A_G:A_B = \sqrt{\frac{r_W}{r_T r_\eta}} \pm \alpha : 1 : \sqrt{\frac{b_W}{b_T b_\eta}} \pm \beta \quad \text{[Equation 4]}$$

$$\alpha \le \frac{1}{2}\left|1 - \sqrt{\frac{r_W}{r_T r_\eta}}\right|$$

$$\beta \le \frac{1}{2}\left|1 - \sqrt{\frac{b_W}{b_T b_\eta}}\right|.$$

2. The liquid crystal display device of claim 1, wherein the $\alpha$ and the $\beta$ each are zero.

3. The liquid crystal display device of claim 1, wherein the illumination device comprises a light guide opposing the display panel, and
the red light-emitting element, the green light-emitting element and the blue light-emitting element irradiate light onto a side surface of the light guide.

4. The liquid crystal display device of claim 1, wherein the red light-emitting element, the green light-emitting element and the blue light emitting element emit laser light.

5. The liquid crystal display device of claim 3, wherein the light guide includes a first side surface and a second side opposite to the first side surface,
the illumination device includes a first light source opposing the first side surface and a second light source opposing the second side surface, and
each of the first light source and the second light source includes the red light-emitting element, the green light-emitting element and the blue light-emitting element.

6. The liquid crystal display device of claim 5, wherein the illumination device comprises a first reflective structure which makes the light guide to emit light from the first light source, and a second reflective structure which makes the light guide to emit light from the second light source.

7. The liquid crystal display device of claim 6, wherein the light guide includes a first surface and a second surface opposite to the first surface,
the display panel opposes the second surface, and
the first reflective structure and the second reflective structure are provided on the first surface.

8. The liquid crystal display device of claim 7, wherein the first reflective structure is located between a center of the light guide and the second side surface, and
the second reflective structure is located between the center and the first side surface.

9. The liquid crystal display device of claim 1, wherein the red sub-pixel, the green sub-pixel and the blue sub-pixel are aligned along a first direction,
aperture regions of the red sub-pixel, the green sub-pixel and the blue sub-pixel have a same width along a second direction which intersects the first direction, and
widths of the aperture regions of the red sub-pixel, the green sub-pixel and the blue sub-pixel along the first direction are different from each other.

* * * * *